United States Patent
Mancour

(10) Patent No.: US 7,009,983 B2
(45) Date of Patent: Mar. 7, 2006

(54) METHODS AND APPARATUS FOR BROADCAST DOMAIN INTERWORKING

(75) Inventor: Timothy Mancour, Wrentham, MA (US)

(73) Assignee: Enterasys Networks, Inc., Andover, MA (US)

( * ) Notice: Subject to any disclaimer, the term of this patent is extended or adjusted under 35 U.S.C. 154(b) by 386 days.

(21) Appl. No.: 10/288,243

(22) Filed: Nov. 5, 2002

(65) Prior Publication Data

US 2004/0085997 A1 May 6, 2004

(51) Int. Cl.
*H04L 12/56* (2006.01)
(52) U.S. Cl. ...................... 370/401; 370/469
(58) Field of Classification Search ............. 370/401, 370/402, 403, 469, 395.54; 709/249
See application file for complete search history.

(56) References Cited

U.S. PATENT DOCUMENTS

| | | | |
|---|---|---|---|
| 6,023,563 A * | 2/2000 | Shani | 709/249 |
| 6,262,988 B1 * | 7/2001 | Vig | 370/401 |
| 6,490,292 B1 * | 12/2002 | Matsuzawa | 370/401 |
| 6,510,159 B1 * | 1/2003 | Noriyuki | 370/401 |
| 6,625,658 B1 * | 9/2003 | Oguchi et al. | 709/238 |
| 6,721,353 B1 * | 4/2004 | Taubert et al. | 375/220 |
| 6,747,979 B1 * | 6/2004 | Banks et al. | 370/401 |
| 2003/0108051 A1 * | 6/2003 | Bryden et al. | 370/395.54 |
| 2004/0202171 A1 * | 10/2004 | Hama | 370/395.1 |

FOREIGN PATENT DOCUMENTS

EP 0998081 * 9/1999

* cited by examiner

*Primary Examiner*—Min Jung
(74) *Attorney, Agent, or Firm*—Lowrie, Lando & Anastasi, LLP

(57) ABSTRACT

A P device interworks CE devices connected to the P device using different types of data links. The P device learns the address of a local CE device by monitoring the control messages, such as address resolution messages, originating from the local device. The P device may share the address of a local CE device with another local CE device by initiating a control message or responding to a control message issued by one of the local CE devices. This latter mechanism in effect hides the heterogeneous nature of the network.

21 Claims, 5 Drawing Sheets

METHODS AND APPARATUS FOR BROADCAST DOMAIN INTERWORKING

CROSS-REFERENCE TO RELATED APPLICATIONS

The present application claims the benefit of the co-pending application Ser. No. 10/288,261, filed Nov. 5, 2002 having filed herewith, the entire disclosure of which is incorporated by reference as if set forth in its entirety herein.

FIELD OF THE INVENTION

The invention relates generally to the interworking of customer edge devices in a heterogeneous network and, in particular, to the use of a centralized provider device for interworking customer edge devices.

BACKGROUND OF THE INVENTION

One application for multi-protocol label switching (MPLS) is the implementation of Layer 2 virtual private networks (VPN) using MPLS tunneling. Referring to FIG. 1, a typical wide area network (WAN) includes customer edge (CE) devices 100, 104, 108, and 112, and provider edge (PE) devices 116, 120 and 124. In general, an edge device is a device, e.g., a router, that sits on the edge of a network cloud such as the Internet or a private network. The customer edge devices connect a customer to a provider network using a data link technology, such as frame relay, while the provider edge devices reside on the edge of the provider network and aggregate connections from the customer sites. In many traditional configurations, the CE "devices" 100, 104, 108, and 112 are actually groups of homogeneous CE devices—i.e., multiple CE devices that are connected to their PE device using the same data link or data link type—that share the same edge of their connected PE device.

Each CE device 100, 104, 108, and 112 communicates with its connected PE device 116, 120, and 124 using a data link 128, 132, 136, or 144. In the illustrated network, data link 128 is a gigabit Ethernet data link connecting CE device 100 to PE device 116, data link 144 is a gigabit Ethernet data link connecting CE device 112 to PE device 116, data link 132 is an ATM data link connecting CE device 104 to PE device 120, and data link 136 is a frame relay data link connecting CE device 108 to PE device 124. The WAN of FIG. 1 is a heterogeneous network in that the CE devices in the WAN communicate with their associated PE devices using different data link layer protocols.

Each CE device may be said to be "local" to the PE device it is attached to, and "remote" to the other PE devices in the WAN. For example, CE devices 100 and 112 are local to PE device 116 and remote to PE devices 120 and 124. Similarly, CE device 104 is local to PE device 120 and remote to PE devices 116 and 124.

The PE devices 116, 120, and 124 may communicate with each other through a network cloud 140 using various methods based on Border Gateway Protocol (BGP), Label Distribution Protocol (LDP), Layer 2 Tunneling Protocol (L2TP), etc. For example, using BGP through the cloud 140, the PE devices 116, 120, and 124 may exchange information that describes the blocks of Layer 2 virtual circuits connected to each PE device. After this exchange of information and/or through configuration, each PE device is aware of the CE devices that belong to its own virtual private network (VPN) and the identifiers for the data links that connect those CE devices.

In operation, for example, when CE device 100 transmits information to CE device 104 across their VPN, CE device 100 first transmits its frame of information to its connected PE device 116. The PE device 116 reads the Layer 2 header in the frame to identify the destination CE device 104. The PE device 116 removes the Layer 2 header from the frame and concatenates the raw IP packet with a VPN label that identifies the destination CE device 104 and its associated PE device, i.e., PE device 120. Then, the PE device 116 transmits the data using an MPLS tunnel through the network cloud 140 to the destination CE device's attached PE device 120. The PE device 120 receives this information and removes the VPN identifier from the packet. The PE device 120 prepends a Layer 2 header that identifies the destination CE device 104 to the packet before transmitting it to the destination CE device 104 over the data link 132.

This MPLS-based Layer 2 VPN is scalable, in that a new CE device may be added to the WAN by physically connecting the CE device to an existing PE device, and then manually reconfiguring the PE device. However, it fails to provide a mechanism whereby the PE device would automatically configure itself and its peer PE devices to add the new CE device to the network. Such a mechanism is desirable in that it reduces the amount of human intervention required to add a new CE device to the network. Moreover, this VPN does not provide a mechanism for satisfying control messages, such as address resolution messages (e.g., an ARP request), sent from one CE device using one type of data link (e.g., a frame relay link) that is attempting to discover the address of a second CE device across the VPN that uses a different type of data link (e.g., an ATM link).

SUMMARY OF THE INVENTION

The present invention relates to methods and apparatus that facilitate the interworking of heterogeneous branches in a VPN utilizing a single, centralized provider (P) device along the emulated circuit path. The P device learns the addresses of the local CE devices by monitoring the control messages, such as address resolution messages, originating from the CE devices. In accord with this embodiment, the P device may share the address of a local CE device with another local CE device by initiating a control message or responding to a control message issued by one of the local CE devices. This latter mechanism in effect hides the distributed, heterogeneous nature of the network.

In one aspect, therefore, the present invention provides a method of resolving network addresses between network devices on a heterogeneous network in a device bridging data link layer protocols and network layer protocols. Information concerning a first device in communication with a first data link is gathered from a control message, such as an address resolution message. Packets are received from a second device in communication with a second data link, the first and second data links utilizing different data link layer protocols, wherein one of the first and second data links is a bridging data link and the other data link is a point-to-point data link. The packets are transmitted to the first device using the gathered information concerning the first device. The step of transmitting the packets may include prepending a header identifying the second device to a received packet.

The gathered information may be the first device's IP address, circuit information, a VC or VPN MPLS label, or the IP address for the second device associated with that label. Suitable bridging data links include gigabit Ethernet (IEEE 802.3 or 802.1q); suitable point-to-point data links may utilize frame relay, point-to-point protocol (PPP), asynchronous transfer mode (ATM), or high-level data link control protocol (HDLC). Accordingly, depending on the type of data link, the control message may be, respectively, an RDP message, an IARP message, an IPCP message, or an INATMARP message. In one embodiment, a response to the control message is generated using a placeholder value.

In another aspect, the present invention provides a system that resolves network addresses between network devices on a heterogeneous network. The system includes a first device bridging data link layer protocols and network layer protocols and a second device in communication with the first device using a first data link. A third device is in communication with the first device using a second data link that uses a different data link layer protocol from the first data link, wherein one of the first and second data links is a bridging data link and the other data link is a point-to-point data link. The first device gathers information concerning the second and third devices from control messages, such as address resolution messages, sent by the second and third devices. Suitable bridging data links include gigabit Ethernet data links (IEEE 802.3 or 802.1q); suitable point-to-point data links include frame relay data links, PPP data links, ATM data links, and HDLC data links.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

In brief overview, the present invention permits a P device in a heterogeneous network to learn the address information for its locally-connected CE devices by monitoring the control messages sent by the CE devices. In one embodiment, the P device shares this learned address information with its other locally-connected CE devices. Using this information, the P device transparently routes communications between CE devices that are connected to the P device using bridging and point-to-point links.

Figure 1:
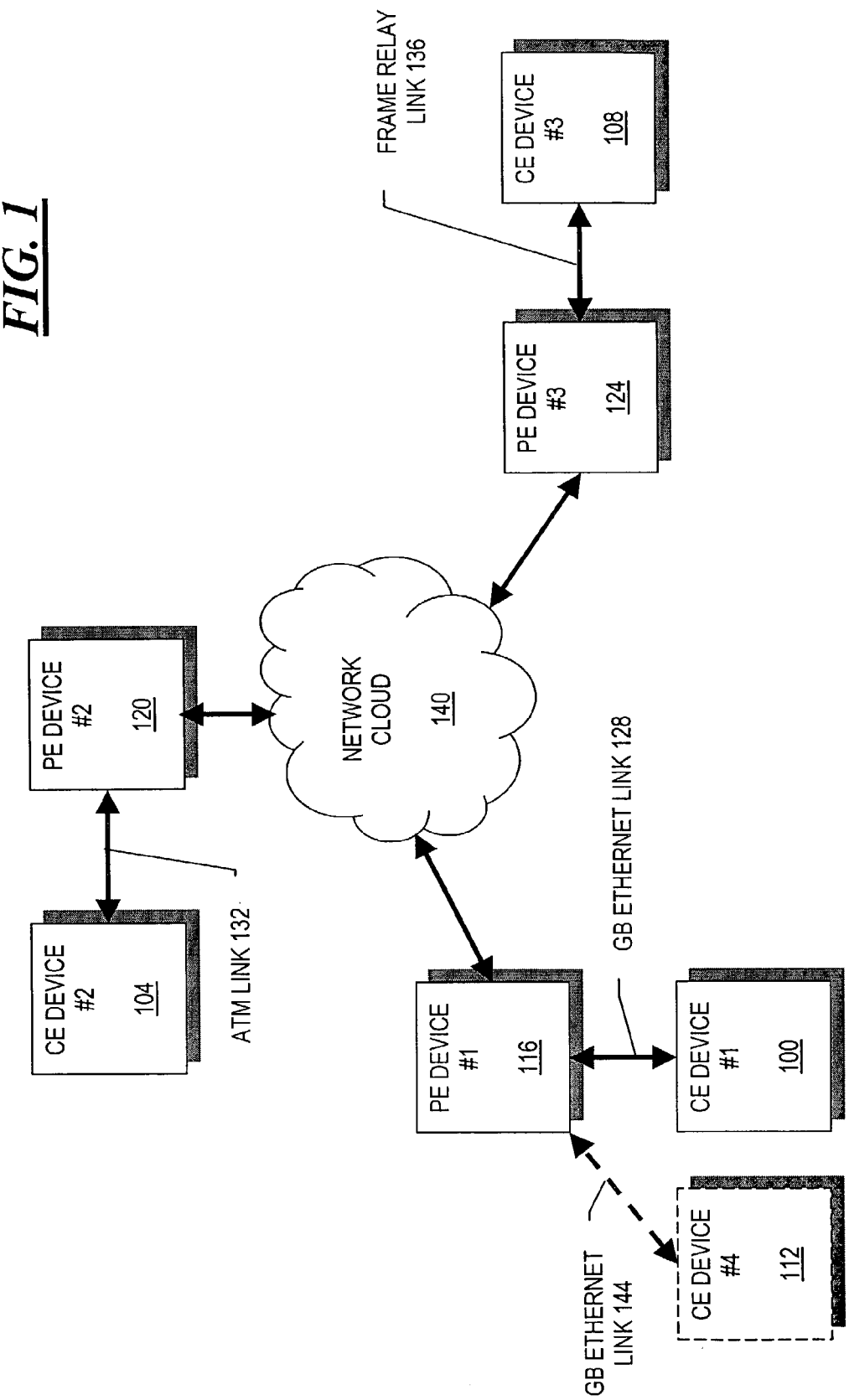
FIG. 1 depicts a WAN having CE devices connected locally to their respective PE devices and remotely to other PE devices through a network cloud.
Figure 2:
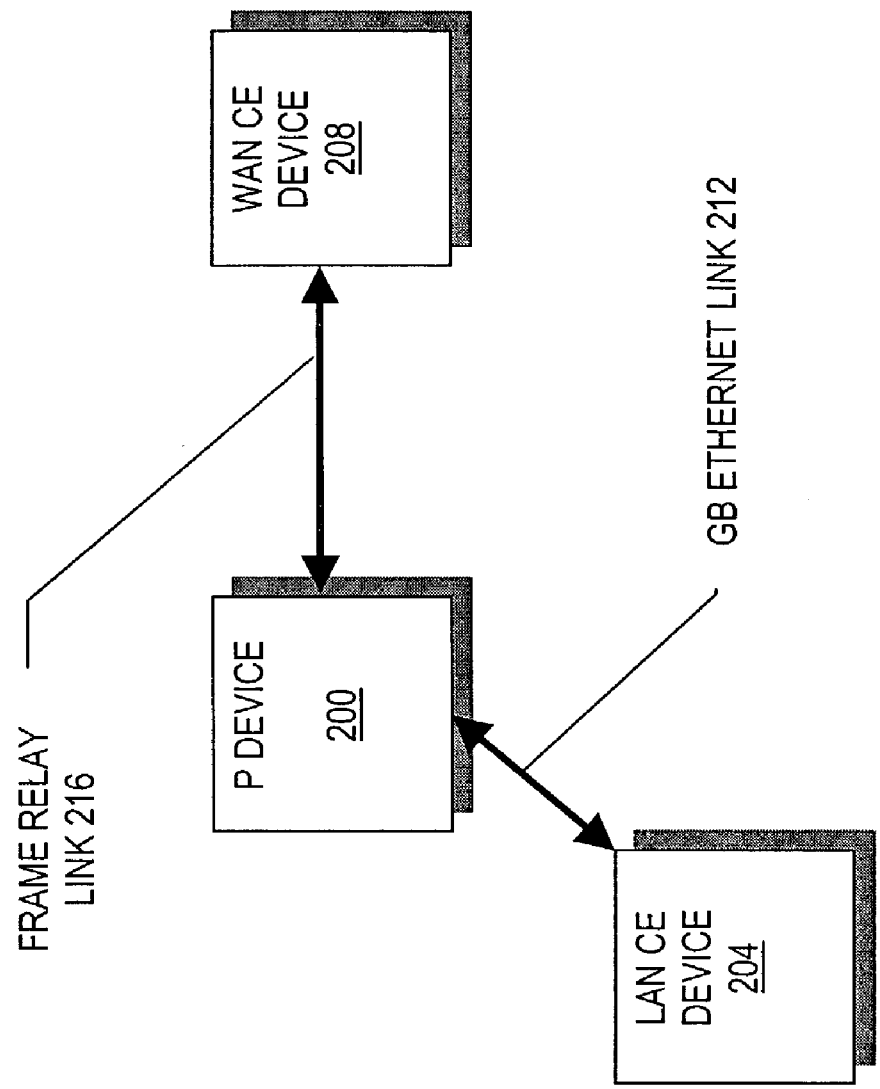
FIG. 2 depicts a WAN having a centralized P device connecting CE devices on heterogeneous network branches in accord with the present invention.

FIG. 2 presents an embodiment of the present invention that utilizes a single P device 200 to bridge heterogeneously-connected local CE devices 204 and 208. The CE "devices" 204 and 208 may themselves be groups of homogeneous CE devices—i.e., multiple CE devices that are connected to the P device 200 using the same data link or data link type—that share the same edge of the P device 200. Local-area network (LAN) CE device 204 is connected to the P device 200 through gigabit Ethernet data link 212, which may or may not support VLAN tagging. WAN CE device 208 is connected to the P device 200 through frame relay data link 216 or, alternately, through another point-to-point data link like an ATM connection.

Figure 3:
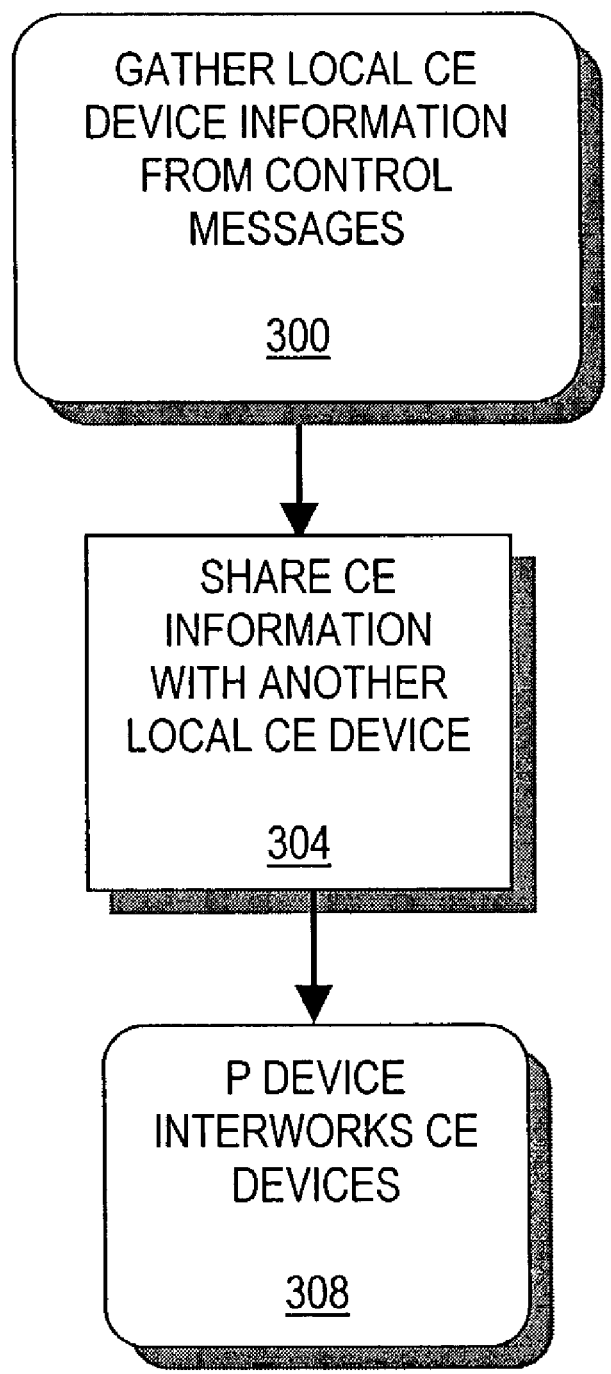
FIG. 3 is a flowchart illustrating one embodiment of a method for the automatic configuration of a centralized P device.
Figure 4:
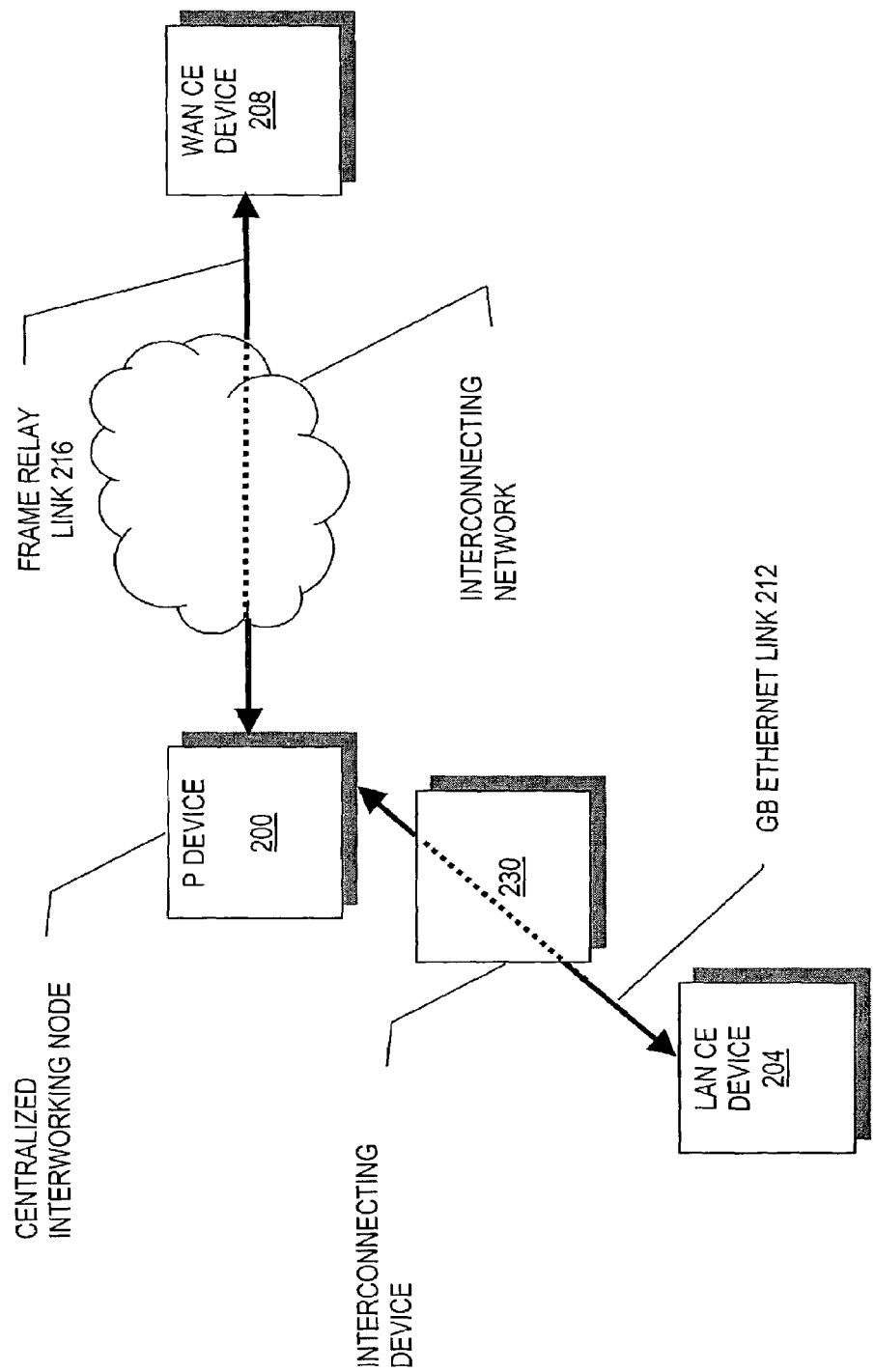
FIG. 4 depicts a WAN utilizing a centralized P device performing broadcast domain interworking through a network.

In brief overview, the P device 200, which is configured for IP interworking, monitors the control messages, such as address resolution messages, from the CE devices 204 and 208 to gather address information concerning its local CE devices (FIG. 3, Step 300). The centralized P device 200 also responds to control messages generated by CE devices 204 and 208 (FIG. 3, Step 304) and shares its learned address information. In embodiments where the central P device 200 is in communication with the CE device through a network, e.g., as illustrated in FIG. 4, the central P device 200 may also respond to control messages, such as address resolution messages, from the remote device at the other side of the network. The central P device 200 will also operate with a CE device in communication with the central P device through an intervening P device 230 (also illustrated in FIG. 4). Once the address information is learned, the centralized P device 200 replaces the Layer 2 headers of the IP PDUs as packets are switched between CE device 204 and CE device 208 (FIG. 3, Step 308).

Before the centralized P device 200 can provide end-to-end interconnectivity for different CE devices on different virtual circuits, it needs to know the address information for the various CE devices. On the LAN side, the P device typically learns an IP address and a hardware address, such as a MAC address, from a control message, such as an address resolution message. On the WAN side, the P device typically learns an IP address from a control message. The centralized P device 200 learns this information (FIG. 3, Step 300) when the LAN CE device 204 initiates an ARP request soliciting the MAC address of the WAN CE device 208, or when the WAN CE device 208 initiates an INARP request soliciting the protocol address of the LAN CE device 204. The centralized P device 200 may also be statically configured with WAN IP addresses, LAN IP addresses, or LAN MAC addresses.

If the centralized P device 200 receives an ARP request from the LAN CE device 204 before it learns the IP address of the WAN CE device 208, then the ARP request will not be serviced, but the IP and MAC addresses of the LAN CE device 204 would be learned. Similarly, if the centralized P device 200 receives an INARP request from the WAN CE device 208 before it learns the MAC and IP addresses of the LAN CE device 204, then the INARP request will not be serviced, but the protocol address of the WAN CE device 208 would be learned.

As long as the centralized P device 200 has learned one set of WAN or LAN addresses prior to receiving an ARP request, then the centralized P device 200 may optionally reply to the ARP request (FIG. 3, Step 308). For example, if the target IP address of the ARP request matched the learned IP address of the WAN CE device 208, then the MAC address of the interface which received the ARP request may be provided in reply to the ARP request. Similarly, if the IP address of the LAN CE device 204 is known to the centralized P device 200 when it receives an IARP request, the centralized P device 200 may supply the IP address of the LAN CE device 204 in an IARP reply. Once both sets of CE addresses are learned the centralized P device 200 may transparently switch the IP PDUs between the LAN CE device 204 and the WAN CE device 208 (FIG. 3, Step 308).

Additional configuration may be required to interconnect the local CE devices 204 and 208 with remote CE devices. For example, if the remote CE devices are at the end of an MPLS tunnel, then the SONET interfaces of the centralized P device 200 should be configured with a global MAC address. This configured global MAC address can then be provided in replies to ARP requests received through the MPLS tunnel and subsequently may be used in the Ethernet encapsulation of the data that is to be sent to the WAN CE device 208. When the remote CE devices use VLAN tag switching and the VLAN tags are cross-connected to the MPLS tunnel, then the global address will be ignored and the CE traffic will be switched into the MPLS tunnel based on the VLAN tag in the Ethernet header.

FIG. 3 presents a method for the automated configuration of a centralized P device in accord with the present invention. First, the P device gathers information concerning its locally-connected CE devices by monitoring the control messages sent by the CE devices (Step 300). The P device may now share the information concerning one local CE device with another locally-connected CE device, either directly or indirectly (Step 304). Once address information has been learned, the P device may participate in interworking as described above (Step 308).

Gathering Local CE Device Information

In one embodiment, the control messages from the local CE devices (Step 300) are address resolution messages. The information gathered from the control messages may include, but is not limited to, one or more of a local CE device's IP address, circuit information, a virtual channel (VC) or VPN MPLS label, or the IP address for the CE device associated with that label. Once gathered, this information may be stored as a tuple or other data structure in a volatile memory, such as a random-access memory (RAM), and/or a nonvolatile memory, such as a hard disk. Although the process for gathering information (Step 300) varies depending on the type of data link connecting the CE device to the centralized P device, it typically includes the receipt of a control message from the CE device, the extraction of information concerning the local CE device from the message and, optionally, the storage of this information in a volatile or a non-volatile memory.

When the data link is a gigabit Ethernet data link, e.g., data link 212, the P device may learn the address of a local CE device (Step 300) on a given Ethernet circuit using router discovery protocol (RDP), as set forth in IETF RFC 1256 and incorporated by reference as if set forth fully herein. If the P device is connected to the local CE device using gigabit Ethernet with virtual local-area network (VLAN) tagging (as described in IEEE standard 802.1Q and incorporated by reference as if set forth fully herein), then the VLAN tag may represent an IP subnet and the circuit information will then consist of Ethernet interface information and the VLAN tag. If the P device does not use IEEE 802.1Q VLAN tagging, then the entire Ethernet port is treated as a single endpoint that is connected to one remote endpoint through a pair of PE devices, the Ethernet interface is the IP subnet, and the circuit information only includes Ethernet interface information. Regardless of whether the P device supports IEEE 802.1Q tagging, only one CE device—in this case the Ethernet router end station—is presumed to participate within the IP interworking-based Layer 2 VPN.

When the data link is a frame relay data link, e.g., data link 216, a newly-attached CE device may generate an inverse address resolution protocol (IARP) request—defined in IETF RFC 2390 and incorporated by reference as if set forth in its entirety herein—to obtain the IP addresses of its neighboring devices when the data link connection identifier (DLCI) associated with the IP interface becomes active. Typically, the DLCI will become active when the local P device has learned cross-connect information. Once the local CE device issues the IARP request, the attached P device may determine the local CE device's IP address and DLCI information from the IARP request (Step 300).

When the data link uses point-to-point protocol (PPP), then the attached CE device participates in internet protocol control protocol (IPCP, defined in IETF RFC 1332 and incorporated by reference as if set forth in its entirety herein) to obtain the IP addresses for its neighbor devices. By examining the local CE device's IPCP request, the P device may determine the CE device's IP address (Step 300).

When the data link is an asynchronous transfer mode (ATM) link, an attached CE device treats each virtual circuit (VC) as an IP subnet. The attached CE device may participate in inverse ATM ARP (INATMARP, defined in IETF RFC 1577 and incorporated by reference as if set forth in its entirety herein) to obtain the IP addresses for its neighbor devices. The P device may learn the local CE device's IP address from the local CE device's INATMARP request (Step 300).

The high-level data link control protocol (HDLC, described in ISO Standard 3309 and incorporated by reference as if set forth in its entirety herein) does not specify a protocol mechanism for obtaining the IP address of a neighboring device. Instead, a device using HDLC receives IP data frames from a single remote endpoint and, therefore, implicitly assumes the presence of a single IP address. Therefore, when the data link connecting the P device to its local CE device is an HDLC data link, the P device is manually configured with the IP address of the local CE device (Step 300).

The P device may also inspect IP multicast messages to obtain pertinent address information (Step 300).

Sharing Remote CE Device Information with Local CE Device

Having gathered information from the control messages sent by the local CE devices (Step 300), a centralized P device may now share information concerning one local CE device with another of its local CE devices (Step 304). This shared information may include, for example, one or more of the local CE device's IP address, circuit information, a virtual channel (VC) or VPN MPLS label, or the IP address for the CE device associated with that label.

Although the process for sharing the information (Step 304) varies depending on the type of data link between the local CE device and the P device, the process is typically either active, e.g., the P device transmits a control message, such as an address resolution message, to its local CE device, or passive, e.g., the P device responds to its local CE device's control message with the another local CE device's address information.

When the data link is a gigabit Ethernet data link, the P device may generate an address resolution protocol request (ARP, defined in IETF RFC 826 and incorporated by reference as if set forth in its entirety herein) to present the IP address of the remote CE device as a neighbor to the local CE device (Step 304). If the P and CE devices support IEEE 802.1Q tagging, then the request must be generated within the VLAN scope. The P device may also respond to the local CE device's ARP request with its own MAC address as the target hardware address when the WAN IP address of the other local CE device is known (Step 304). To make communications with other local CE devices transparent, the centralized P device may optionally provide its MAC address in the source hardware address field of the ARP request and the target hardware address field of the ARP reply. If two CE devices are locally attached to the P device on gigabit Ethernet data links, then the central P device may propagate an ARP request or an ARP response with VLAN tag translation directly to the second CE device.

When the data link is a frame relay data link and the P device has received cross-connect information from a remote P device then the central P device may initiate an IARP request providing the address information for the locally-connected LAN CE device to another locally-connected CE device, or it may wait for an attached CE device to generate an IARP request and then respond with the address information for the other CE device (Step 304).

When the data link uses PPP, the P device may respond to IPCP requests from a local CE device with the IP address information for the other local CE device when that information becomes available (Step 304). If the IP address information and the cross-connect information are available, the P device may also initiate an IPCP request to provide the local CE device with address information for the another locally-connected CE device (Step 304).

When the data link is an ATM data link, the P device may generate an INATMARP message for a locally-connected LAN CE device when the address information for the another locally-connected CE device becomes available (Step 304). If the central P device has received the cross-connect information and the associated IP address information from a local CE device, then the central P device may optionally respond to an INATMARP request received from another local CE device (Step 304).

As discussed above, the address information for a local CE device may not be available to the central P device when that P device receives a control message, such as an address resolution message, from another locally-connected CE device. In that event, if the CE device's information is not available, then the P device may advertise the address information for the other local CE devices without the CE device's actual address by using a dummy value (such as zero). When the address information for the locally-connected CE device becomes available, the P device may generate a new advertisement to its other local CE devices with an updated IP address field value.

Figure 5:
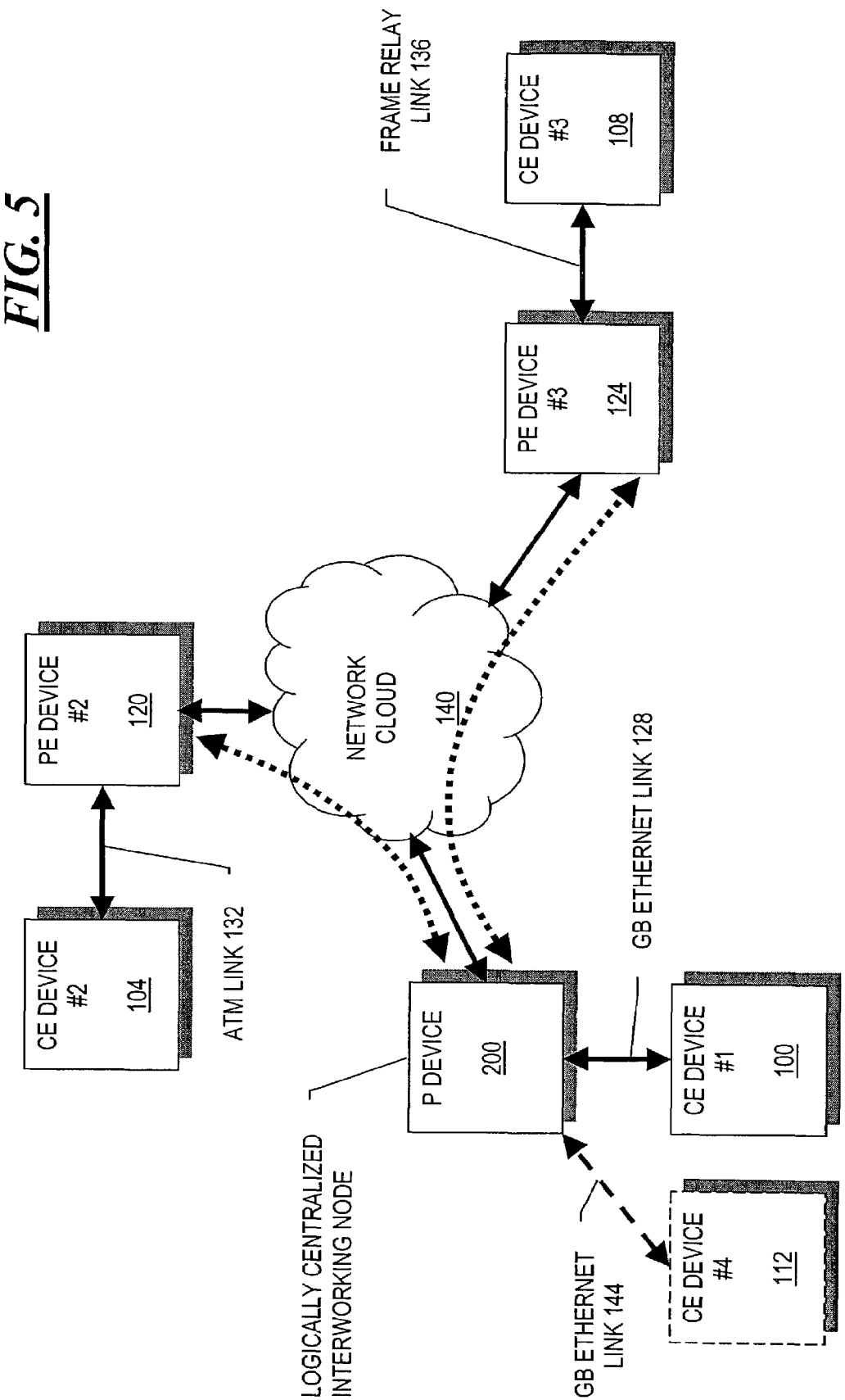
FIG. 5 depicts the WAN of FIG. 1 having a centralized P device 200 configured to support broadcast interworking.

Although FIG. 2 depicts a single P device 200, in a typical configuration there are still several PE nodes in the network that are in communication with the P device 200. Referring to FIG. 5, these other PE nodes are also typically in communication with their own CE devices using data links such as WAN data links. In this embodiment, the centralized P device 200 is typically connected to its CE devices by a data link type that differs from that of the data links utilized by the PE devices. Thus, the addition of the new type of data link can be supported by configuring the centralized P device 200 to support broadcast domain interworking. This reduces the disruption to installed equipment by implementing broadcast domain interworking at the P device 200.

Many alterations and modifications may be made without departing from the spirit and scope of the invention. Therefore, it is to be understood that these embodiments have been shown by way of example and should not be taken as limiting the invention, which is defined by the following claims. These claims are thus to be read as not only including literally what is set forth by the claims but also to include those equivalents which are insubstantially different, even though not identical in other respects to what is shown and described in the above illustrations.

What is claimed is:

1. In a device bridging data link layer protocols and network layer protocols, a method of resolving network addresses between network devices on a heterogeneous network, the method comprising:
   gathering information from a control message concerning a first device in communication with a first data link;
   responding to the control message using information gathered by the device, if available;
   receiving packets from a second device in communication with a second data link, the first and second data links using different data link layer protocols; and
   transmitting the packets to the first device using the gathered information concerning the first device, wherein one of the first and second data links is a bridging data link and the other data link is a point-to-point data link.

2. The method of claim 1 wherein the control message is an address resolution message.

3. The method of claim 1 wherein the gathered information is at least one of the first device's IP address, circuit information, a VC or VPN MPLS label, or the IP address for the second device associated with that label.

4. The method of claim 1 wherein the first data link is a gigabit Ethernet data link.

5. The method of claim 4 wherein the control message is an RDP message.

6. The method of claim 1 wherein the first data link is a frame relay data link.

7. The method of claim 6 wherein the control message is an IARP message.

8. The method of claim 1 wherein the first data link is a PPP data link.

9. The method of claim 8 wherein the control message is an IPCP message.

10. The method of claim 1 wherein the first data link is an ATM data link.

11. The method of claim 10 wherein the control message is an INATMARP message.

12. The method of claim 1 wherein the first data link is an HDLC data link.

13. The method of claim 1 wherein transmitting the packets comprises prepending a header identifying the second device to a received packet.

14. The method of claim 1 further comprising responding to the control message using a placeholder value.

15. A system that resolves network addresses between network devices on a heterogeneous network, the system comprising:
   a first device bridging data link layer protocols and network layer protocols;
   a second device in communication with the first device using a first data link; and
   a third device in communication with the first device using a second data link, the first and second data links using different data link layer protocols,
   wherein the first device gathers information concerning the second and third devices from control messages sent by the second and third devices, one of the first and second data links is a bridging data link, and the other data link is a point-to-point data link; and wherein the first device is adapted to respond to the control messages using the information gathered.

16. The system of claim 15 wherein the control messages are address resolution messages.

17. The system of claim 15 wherein the first data link is a gigabit Ethernet data link.

18. The system of claim 15 wherein the first data link is a frame relay data link.

19. The system of claim 15 wherein the first data link is a PPP data link.

20. The system of claim 15 wherein the first data link is an ATM data link.

21. The system of claim 15 wherein the first data link is a HDLC data link.

* * * * *